Dec. 27, 1955     T. L. GATKE     2,728,700
FRICTION MEMBER
Filed March 16, 1953
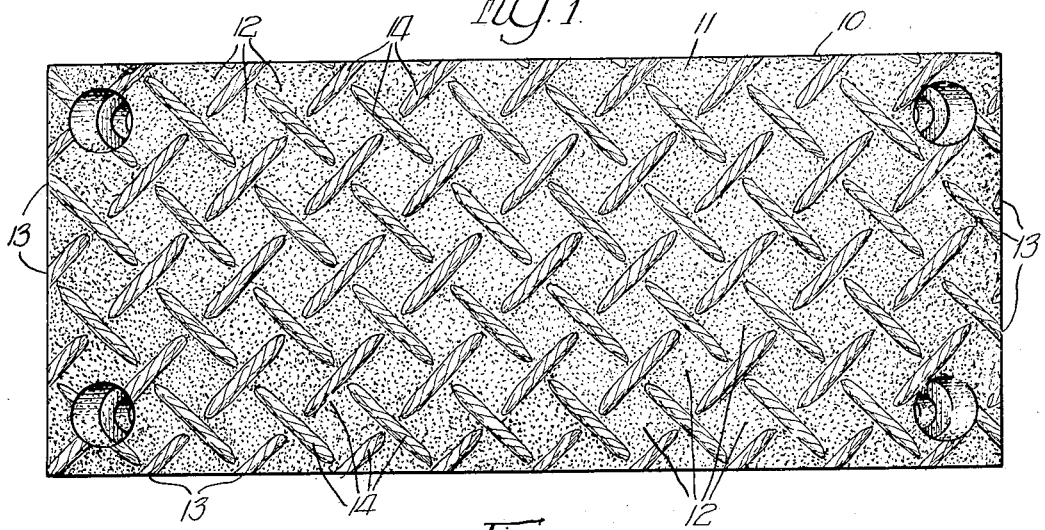
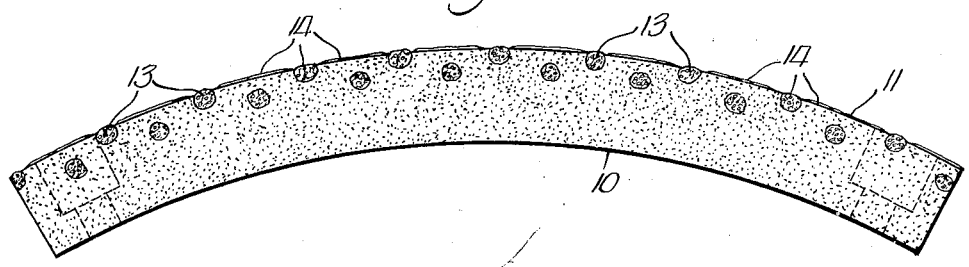
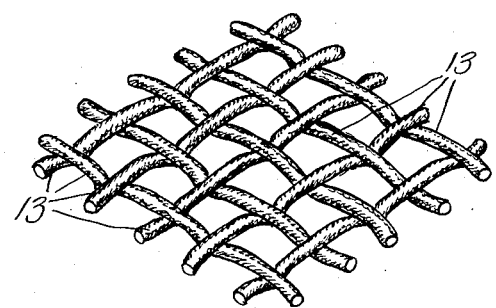
INVENTOR.
Thomas L. Gatke,
BY
Cromwell, Greist + Warden
Attys.

United States Patent Office 2,728,700
Patented Dec. 27, 1955

2,728,700

FRICTION MEMBER

Thomas L. Gatke, Oak Park, Ill.

Application March 16, 1953, Serial No. 342,467

4 Claims. (Cl. 154—52)

The object of the present invention is to provide a new and improved friction member of the hard, solid block type, for use in flatwise engagement with a complementary brake or clutch element.

The new friction member possesses the strength, holding power, long life and other advantages of the well known hard, molded composition friction block, which it primarily resembles, and yet does not have the glazing tendency and other disadvantages commonly experienced with such blocks. While quite unlike friction members of the cured woven fabric type, it nevertheless additionally possesses the cleaning action, quietness, and certain of the other more desirable characteristics of such members, without the weakness, compressibility and other shortcomings of the latter.

The new friction member combines structurally and functionally in a single, integrally formed, waffle-like surface formation two radically different friction instrumentalities, which instrumentalities are so relatively proportioned and so located with respect to each other as to cooperatively produce a braking or holding action which has been found to be superior to anything heretofore obtainable over a period of time with ordinary friction members of the hard, molded composition type.

The operative face of the member is unique in that it is characterized by a number of relatively large, hard, smooth sections of molded composition friction material of more or less uniform shape and size, which are separated from each other by a second and differently functioning friction instrumentality. These hard sections are in effect fenced off from each other by relatively narrow intervening strips of separately cured, resiliently compressible, yarn-like friction material, which strips are embedded in the face of the member between said hard sections but have exposed portions which normally project more or less continuously beyond said sections.

While the foregoing statements are indicative in a general way of the nature of the invention other objects and advantages will be apparent to those skilled in the art upon a full understanding of the construction of the face of the improved friction member.

A preferred embodiment of the invention is presented herein by way of exemplification, but it will of course be appreciated that the invention may be incorporated in other forms.

In the accompanying drawing:

Fig. 1 is a plan view of a conventionally shaped automotive brake block constructed in accordance with the invention;

Fig. 2 is a side view of the block shown in Fig. 1; and

Fig. 3 is a perspective view of the cured lattice which is embedded in the friction face of the block.

The friction member illustrated in the drawing is a brake block 10 of the type commonly used in automotive brake applications, where the block is attached by rivets, bolts or other fastening means to a brake shoe and acts against the inside of a cylindrical brake drum.

This particular form and application are intended, however, to be merely illustrative, as the improved friction member may be used either in a brake or in a clutch; may be either curved, as shown, or made flat, or cylindrical, or conical; may be rectangular, circular or sector-shaped in form; may be made in either one piece or several; and may constitute either the entire friction means or only a portion or complementary section of the same. It will therefore be appreciated that the invention resides, not in any particular form or application of the friction member, but rather in the novelly constructed and functioning composite friction face presented by the same.

The member 10 is composed for the most part of hard composition friction material which has been molded to present at the operative face of the same a uniform surface 11 for complementary coaction with the face of the oposed braking element. The surface 11, instead of being continuous as in ordinary friction members of this type, is divided into a number of individual face sections 12, all of which are adapted to engage flatly and at the same time with the opposed braking element when brought into contact with the latter.

The individual sections 12 are fenced off from each other by relatively narrow strips 13 of separately cured yarn-like friction material, preferably in the form of cables. The strips 13 are embedded in widely spaced crisscrossed relation in the surface 11 of the friction member, with elongated portions 14 of the strips projecting slightly beyond the faces of the sections 12. The strips 13 are arranged in a lattice-like formation, in widely separated generally parallel relation to each other, and are preferably interlaced by being placed one above the other at the points where they cross, as shown in Fig. 3, in order to hold them in position while they are being assembled, treated and cured and prior to their being embedded in the composition friction material.

While the invention is not limited to any particular size, spacing or projection of the strips 13, excellent results have been obtained where the strips 13 are of approximately ⅛ inch diameter, are spaced from each other in both directions on about ½ inch centers, and project a few thousandths of an inch above the adjoining surfaces of the hard sections 12, thereby separating the sections 12 into squares or diamonds measuring approximately ⅜ inch in each direction.

If desired, one or more additional sets of crisscrossed strips of the pre-cured fabric friction material may be embedded in the composition friction material below the exposed set of strips, to function in the same manner as the first set after the member has been worn down far enough to expose the underlying sets in turn.

While the strips 13 are treated and fully cured and converted into friction material prior to being combined with the molded composition material (which latter material is cured under heat and pressure in the forming mold), and are therefore rather hard, they are softer than the molded friction material and are resiliently compressible to a degree. Because of the yieldability of the strips 13 the projecting portions 14 thereof are compressed into positions flush with the faces of the adjoining sections 12 when the friction member is forced into complete engagement with the opposed braking element, springing back again when the friction member is retracted from the braking element.

The strips 13 are preferably cabled asbestos yarn, on wire cores. They are converted into friction material by impregnation and baking. In curing the strips the same may be saturated with a suitable curing material, such as a synthetic resin of the type ordinarily used in curing woven fabric friction members. After the strips, in their interlaced open mesh form, have been thus saturated they are baked to complete the conversion. Prior to being combined with the moldable friction composition they are preferably covered with a binder, which binder may be the same synthetic resin. The binder, after the cured lattice has been combined with the moldable friction composition, then acts to produce an inseparable bond with such composition under the heat and pressure to which the structure is thereafter subjected in the final shaping and setting operation.

The moldable friction material of which the member 10 is for the most part formed may be of any suitable friction composition capable of being molded. It is preferably of a homogeneous character, except for the optional inclusion of particles of metals, asbestos fibers and the like mixed finely throughout the composition.

In use both the hard molded composition sections 12 and the relatively soft projecting portions 14 combine to give an efficient braking action. The exposed projecting portions 14 of the strips 13, in addition to their own braking action, afford a wiping or cleaning action which in large measure eliminates glazing of the hard sections 12 of the friction member and the face of the opposed drum or other braking element.

The strips 13 are preferably so positioned with respect to the direction in which the friction member moves relative to the opposed braking element as to meet the latter diagonally, which positioning further improves the cleaning action, transmits the stresses more nearly endwise to all of the strips and prevents uneven wear and grooving of the drum.

I claim:

1. A rigid friction member adapted for engagement with a complementary braking element, consisting for the most part of a hard cured non-compressible block of molded friction composition, which block is provided with a smooth friction face adapted for flatwise engagement with said braking element, and a plurality of separately cured strips of yarn-like friction material, which strips are relatively soft and relatively compressible with respect to the molded friction composition of the block and are embedded in widely separated crisscrossing relation in said friction face through the depth of normal wear of the block with portions of the strips normally projecting beyond said face, said projecting portions of the strips, upon forcible engagement of the friction member with said complementary braking element being compressible into positions flush with the intervening portions of the friction face of the block.

2. A rigid friction member adapted for engagement with a complementary braking element, consisting for the most part of a hard cured non-compressible block of molded friction composition, which block is provided with a smooth friction face adapted for flatwise engagement with said braking element, and a plurality of separately cured strips of yarn-like friction material, which strips are relatively soft and relatively compressible with respect to the molded friction composition of the block and are embedded in widely separated criss-crossing relation in said friction face through the depth of normal wear of the block with portions of the strips normally projecting beyond said face, said projecting portions of the strips, upon forcible engagement of the friction member with said complementary braking element, being compressible into positions flush with the intervening portions of the friction face of the block, and said strips being so arranged as to extend at an oblique angle to the direction of relative movement between the friction member and said complementary braking element during the braking operation therebetween.

3. A rigid friction member adapted for engagement with a complementary braking element, consisting for the most part of a hard cured non-compressible block of molded friction composition, which block is provided with a hard smooth friction face adapted for flatwise engagement with said braking element, and a plurality of substantially continuous strip-like formations of cured yarn-like friction material, which strip-like formations are relatively soft and relatively compressible with respect to the molded friction composition of the block and are embedded in widely separated relation in said friction face through the depth of normal wear of the block with portions of the strip-like formations normally projecting beyond said face, the width of the projecting portions of the strip-like formations being substantially less than the width of the portions of the friction face of the block separating the same, and said projecting portions upon forcible engagement of the friction member with said complementary braking element being compressible into positions flush with the intervening portions of the friction face of the block.

4. A rigid friction member adapted for engagement with a complementary braking element, consisting for the most part of a hard cured non-compressible block of molded friction composition, which block is provided with a hard smooth friction face adapted for flatwise engagement with said braking element, and a plurality of substantially continuous strip-like formations of cured yarn-like friction material, which strip-like formations are relatively soft and relatively compressible with respect to the molded friction composition of the block and are embedded in widely separated relation in said friction face through the depth of normal wear of the block with portions of the strip-like formations normally projecting beyond said face, the width of the projecting portions of the strip-like formations being substantially less than the width of the portions of the friction face of the block separating the same, and said projecting portions upon forcible engagement of the friction member with said complementary braking element being compressible into positions flush with the intervening portions of the friction face of the block, the wear portion of the friction member throughout the normal depth of wear consisting predominantly of said intervening portions of the block of molded friction composition, and the friction member inwardly of the normal depth of wear consisting entirely of the block of molded friction composition.

References Cited in the file of this patent

UNITED STATES PATENTS

| 1,700,037 | Evans | Jan. 22, 1929 |
| 2,025,052 | Hess | Dec. 24, 1935 |
| 2,052,808 | Spokes | Sept. 1, 1936 |
| 2,077,669 | Bruce | Apr. 20, 1937 |
| 2,555,261 | Walters | May 29, 1951 |

FOREIGN PATENTS

| 478,974 | Great Britain | Jan. 28, 1938 |